United States Patent Office 2,706,741
Patented Apr. 19, 1955

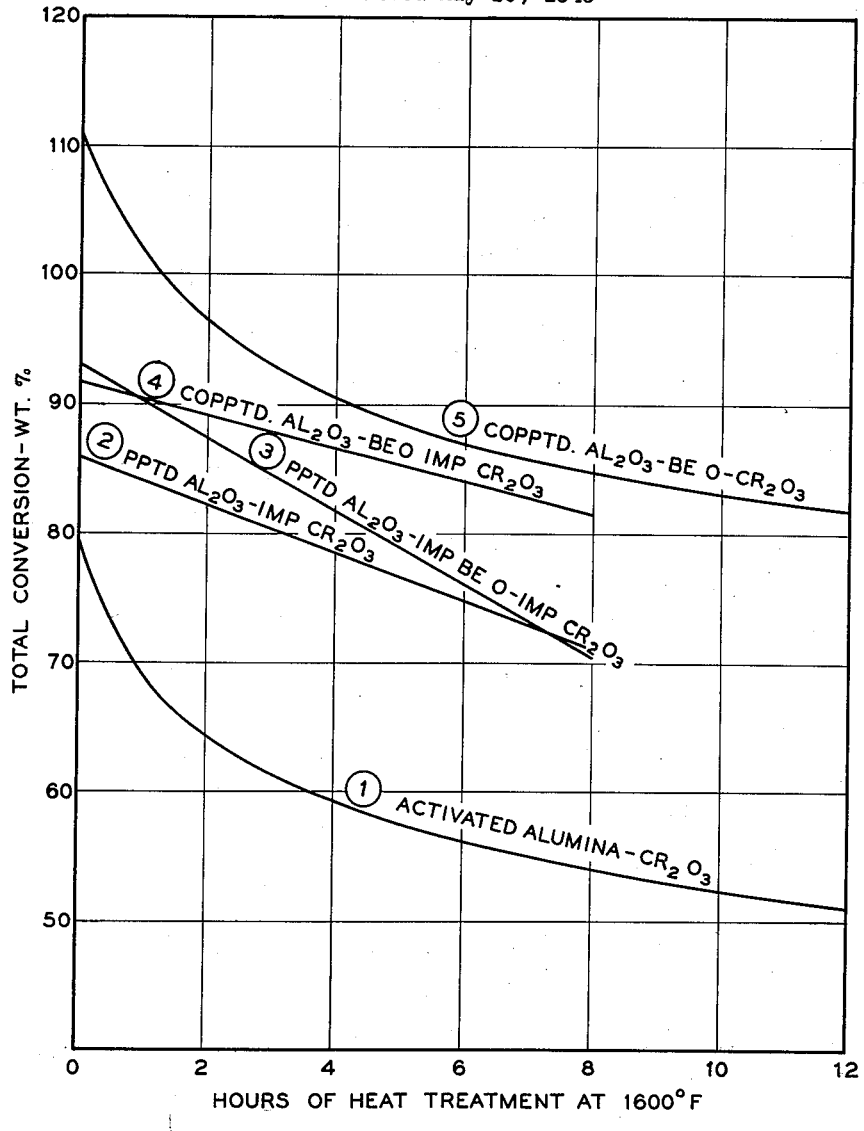

2,706,741

CATALYTIC CONVERSIONS OF HYDROCARBONS

Robert P. Sieg, Berkeley, and Homer B. Wellman, Oakland, Calif., assignors to California Research Corporation, San Francisco, Calif., a corporation of Delaware Application May 16, 1949, Serial No. 93,458

7 Claims. (Cl. 260—683.3)

This invention relates to catalysts and the process of making the same. More particularly, the invention relates to processes for manufacturing dehydrogenation catalysts containing a catalyst promoter and further relates to catalytic dehydrogenation processes for light or normally gaseous hydrocarbons such as butane and butenes.

Various catalysts have been used for the purpose of catalytically dehydrogenating hydrocarbons. Among such catalysts are metal oxides of the sixth group of the periodic table. It is known that catalytic activity is improved by supporting these dehydrogenating catalysts on suitable carriers such as alumina, magnesia, silica-alumina mixtures, zirconia, and thoria. Likewise, it is known that suitable compounds of beryllium have a promoting effect on dehydrogenation catalysts.

Catalytic dehydrogenation of hydrocarbons wherein the catalysts given above are employed, is well known. A typical example of this process is the dehydrogenation of butane to butylene and butadiene or mixtures thereof, which is accomplished by contacting butane with a dehydrogenation catalyst at temperatures ranging from approximately 900° F. to 1200° F. and at pressures ranging from approximately 1 to 50 p. s. i. abs.

An object of the invention is to provide an efficient catalyst for the process of converting saturated hydrocarbons to unsaturated hydrocarbons.

An equally important object of this invention is to provide a catalyst for dehydrogenating hydrocarbons which has a high-sustained rate of conversion and is not easily poisoned.

A more specific object is to provide a catalyst composition containing a catalyst promoter homogeneously mixed within the catalyst or catalyst support, which permits the catalyst to effect a high thermal stability or resistance to deactivation on heat treatment, and a long sustained high degree of dehydrogenation of hydrocarbons.

A dehydrogenation catalyst widely used in commercial installations is made by impregnating "activated" alumina in a pelleted form with an aqueous solution of chromium or molybdenum compounds and then calcining to convert chromium or molybdenum compounds to the active catalytic oxide. Another dehydrogenation catalyst which, however, has not had wide commercial acceptance contains beryllium in addition to the above composition as a catalyst promoter. This latter catalyst is prepared by impregnating activated alumina with an aqueous solution of a beryllium salt, drying the impregnated alumina, then further impregnating the alumina with an aqueous solution of an active catalytic agent, and thereafter converting the beryllium salt and catalytic agent to their corresponding oxides. It has been discovered that a dehydrogenating catalyst comprising three components, the first of which is an oxide of a metal of the sixth group of the periodic table, the second beryllia, and the third an oxide material of the group consisting of alumina, or a mixture of alumina and silica prepared by coprecipitating at least said second and third components from an aqueous solution of water-soluble compounds containing corresponding elements, produces a catalyst which shows a high selectivity for dehydrogenation reactions, has a high thermal stability, that is, resistance to deactivation and degradation on heat treatment, and gives a high-sustained activity during prolonged use in the dehydrogenation processes.

X-ray diffraction patterns of fresh and heat-treated samples of the catalysts of this invention and other known catalysts of similar chemical compositions reveal marked differences in both crystal lattice and crystallite growth on heat treatment. The diffraction patterns of the catalysts in this invention do not show typical gamma alumina structure which is common to most activated alumina base catalysts. Some of the gamma alumina lines are present but others are absent or have shifted to different distances and still other lines are present which cannot be identified as typical lines of any compounds of the three metals present. The crystal lattice of commercial chromia-alumina dehydrogenation catalysts is composed of the carrier metal oxide gamma alumina with the active catalytic agent chromic oxide being disposed on its surface. Catalysts prepared by impregnating activated alumina with beryllium salts show a still different structure which is similar but not identical with either of the other types. It is believed that the differences in crystal lattice structures connote different surface conditions which may account for the improved thermal stability, more selective conversion, and longer-sustained catalytic activity of catalysts of this invention.

One method of preparing the catalyst of this invention is to add a sufficient amount of ammonium hydroxide to an aqueous solution of, for example, beryllium chloride and aluminum chloride to form a coprecipitate composed of beryllium hydroxide and aluminum hydroxide. The coprecipitate is washed to remove excess ammonium hydroxide and entrained ammonium chloride. The washed coprecipitate, which is in a gel form, is dried at about 220° F. for a sufficient length of time to expel chemically uncombined water. This dried coprecipitate is then ground and pelleted. The pelleted coprecipitate is calcined at about 1100° F. to 1300° F. for about three to five hours to convert the beryllium and aluminum hydroxides to their corresponding oxides. The calcined coprecipitate is then impregnated with an active catalytic agent, for example, a chromic acid solution, by dipping it in a solution of this active catalytic agent. This impregnating step is continued for sufficient time to produce a uniformly impregnated finished catalyst. The content of active catalytic agent in the finished catalyst may be controlled by adjusting the concentration in the impregnating solution. The impregnated coprecipitate is then calcined by heating for about three to five hours at about 1300° F. to convert the active catalytic agent to its oxide and produce catalysts having long-sustained high degree of catalytic activity and high thermal stability which is especially adapted for the dehydrogenation of hydrocarbons such as butane and butene.

Instead of drying the coprecipitate of beryllium hydroxide and, for example, aluminum hydroxide, it has been found that a very desirable catalyst can be obtained by impregnating the coprecipitate, which is in a wet gel form, with the active catalytic agent, for example, chromic acid. After the impregnating step, the impregnated coprecipitate is dried, processed into desired sizes and forms and then is calcined at about 1100° F. to about 1300° F. for about three to five hours to convert the aluminum, beryllium and chromium compounds to their corresponding oxides.

Still another method of preparing the catalysts of this invention is by a process of coprecipitating all the components of the catalyst. For example, an ammonium hydroxide solution is added to an aqueous solution of chromium, aluminum and beryllium salts to form a coprecipitate of said metals. The coprecipitate is then washed, dried, ground, shaped into desired sizes, and afterwards calcined for three to five hours at about 1100° F. to 1300° F.

The calcining steps in the preparation of the catalysts of this invention may be conducted at temperatures of about 700° F. to about 1350° F. or higher with or without the presence of an inert gas such as nitrogen or a reducing agent such as hydrogen. The length of time required for these calcining (or converting steps, as they may be called) varies greatly and is somewhat dependent upon the amount and nature of metal salts or acids to be converted to their corresponding oxides, and on the amount of volatile salts such as ammonium chloride to be expelled. This is especially true in the process of preparing one of the catalysts of this invention which has two calcining steps, as the time and temperature of the first calcining has a marked effect on the rate and uniformity of impregnation, which in turn effects the catalytic properties of the finished catalyst. It has been found, for example, that the coprecipitated beryllia-alumina base can be calcined at such severe conditions as four hours at 1600° F. before impregnation with chromic oxide and the resultant catalyst still demonstrates high and selective dehydrogenation activity. Such severe calcining is beneficial for subsequent impregnation giving a higher rate of impregnation and more uniform distribution of the catalytic agent.

Similarly, the time required to impregnate the gel or calcined coprecipitate with the active catalytic agent depends upon the amount of active catalytic agent to be present in the finished catalyst, upon the concentration of the aqueous solution of the active catalytic agent, and upon the condition of the active catalyst base being impregnated.

The catalyst carrier or base, as it may be called, may consist of oxides of aluminum, or mixtures of aluminum and silicon.

The active catalytic agent of the catalyst of this invention is an oxide of a metal of the sixth group of the periodic table. When chromia is used as this active agent, it is generally preferred to use about 15 to 20 per cent by weight of this compound in the catalyst composition, however, greater or lesser amounts may be used.

The amount of beryllia in the catalysts of this invention should be generally at least about 8 per cent by weight and usually not less than about 5 per cent with about 8 per cent or above being preferred. Catalysts having lower percentages of beryllia will generally have a lower selectivity for dehydrogenation with a corresponding increase in cracking and coke formation which results in a lower conversion to desired products.

In preparing the catalysts of this invention it is preferred to use water-soluble salts of beryllium, aluminum and silicon that are readily coprecipitated; examples include the chlorides, sulfates and nitrates of these elements. Likewise, it is preferred to use water-soluble salts or acids of the metals of the sixth group of the periodic table as the active catalytic agent in preparing the composition of this invention.

The finished catalyst of this invention may be of a granular, pilled, flaked, pelleted or extruded, etc. shape. The size of the catalyst may vary greatly from large size to a size that permits employment of the catalyst in "fluidized" systems.

Further, in addition to butane, the catalyst of this invention is adapted to dehydrogenate ethane, propane, butylene, pentane, pentene, and hydrocarbons up to and above the $C_8$ series and thereby include both normally gaseous and normally liquid hydrocarbons. When the catalyst is used to dehydrogenate higher hydrocarbons the process is commonly termed "reforming" or "aromatization." Thus the term "dehydrogenation" as used herein and in the appended claims is intended to include all processes wherein the hydrocarbon product is less saturated than the feed and where the product is of about the same molecular weight as the feed and with the major difference believed to be accounted for by the removal of hydrogen from the molecule. The temperature required to convert the above-listed hydrocarbons varies widely, but is generally within the range of approximately 700° F. to about 1250° F.

The invention will be better understood by reference to the following examples which are illustrative and are not to be taken as limiting the scope of the invention.

EXAMPLE I

A chromia-alumina catalyst was prepared by the following method:

A quantity of 3/16-in. commercial activated-alumina pellets were immersed in a 40 per cent aqueous chromic acid solution. The acid solution was drained from the pellets and the impregnated pellets were then dried at 220° F. for about six hours to expel chemically uncombined water. The dried pellets were calcined for about six hours at 1400° F. in an 80 per cent air-20 per cent steam mixture in order to convert the chromic acid to chromic oxide (chromia). This method of calcining was employed to simulate conditions used in the production of a commercial dehydrogenation catalyst used in the catalytic dehydrogenation of n-butane.

Analysis of this catalyst showed that it contained about 20 per cent chromia and 80 per cent alumina.

Conversion and operating data for dehydrogenation of butane and a butane-butene feed, utilizing this catalyst, are found in Tables I and II, respectively.

EXAMPLE II

A chromia-alumina catalyst was prepared as follows:

Eight and one-half liters of 30 per cent aluminum chloride solution (equivalent to 1300 g. of alumina) was diluted to 20 gal. with $H_2O$. Concentrated ammonium hydroxide was added to this solution with vigorous stirring until the pH of the solution reached 9.0. Aluminum hydroxide, which was precipitated by this ammonium hydroxide addition, was separated from the solution by filtration and then pressed to remove entrained solution. Thereafter the pressed aluminum hydroxide was repulped and washed with 20 gal. of $H_2O$, three times. The washed aluminum-hydroxide gel was dried in a drying oven for 24 hours at 220° F. to expel chemically uncombined water. The dried gel was ground to pass through an 80-mesh screen; mixed with about three per cent by weight with a pelleting lubricant, then pelleted into 3/16-in. diameter pellets. These pellets were calcined for four hours at 1300° F. to eliminate ammonium chloride, pelleting lubricant and chemically combined water.

The calcined pellets were dipped into a 40 per cent chromic acid solution, allowed to stand until impregnation was uniform and complete, then drained of excess acid solution and dried as before. Thereafter, the dried pellets, impregnated with chromic acid, were calcined for two hours at 1100° F. and three hours at 1300° F.

Inspection of this catalyst showed that it contained 17.1 per cent chromia and 82.9 per cent alumina.

Conversion and operating data for dehydrogenation of butane and a butane-butene feed, utilizing this catalyst, are found in Tables I and II, respectively.

EXAMPLE III

A chromia-beryllia-alumina catalyst was prepared as follows:

A quantity of the calcined alumina pellets of Example II were immersed in an aqueous solution containing 240 g./l. of beryllium chloride, the aqueous solution was drained and then the pellets were dipped into an aqueous solution of ammonium hydroxide to convert the adsorbed beryllium chloride to beryllium hydroxide. The pellets were dried for 24 hours at 220° F., calcined for three hours at 1100° F., and then dipped into a 40 per cent aqueous solution of chromic acid. The chromic and impregnated pellets were drained, dried as before, and calcined at 1100° F. for four hours.

Inspection of this catalyst showed that it contained 17.3 per cent chromia, 6.4 per cent beryllia, and 76.3 per cent alumina.

Conversion and operating data for dehydrogenation of butane and a butane-butene feed, utilizing this catalyst, are found in Tables I and II, respectively.

EXAMPLE IV

A catalyst having a coprecipitated alumina-beryllia base with chromia being disposed on the base, was prepared as follows:

A mixture of aluminum chloride and beryllium chloride was made by adding 12 l. of 30 per cent aluminum chloride (equivalent to 1800 g. of $Al_2O_3$) to 2.66 l. of beryllium chloride (equivalent to 200 g. of BeO) and then diluting with $H_2O$ to a total volume of 26 gel. Concentrated ammonium hydroxide was added to this mixture with vigorous stirring, until a pH of 9 was reached. The coprecipitate of aluminum hydroxide and beryllium hydroxide formed by the addition of ammonium hydroxide was separated from the solution by filtration and then was pressed to remove entrained solution. Thereafter the pressed coprecipitate in gel form was repulped and washed with 25 gal. of $H_2O$, three times. The washed coprecipitate (wet gel) was dried in an oven for about 24 hours at 220° F. The dried precipitate (gel) was ground to pass through an 80-mesh screen; then mixed with three per cent by weight of pelleting lubricant and pelleted into 3/16-in. diameter pellets. The pellets were calcined for four hours at 1300° F., cooled, and dipped in a 40 per cent chromic-acid solution, allowed to soak until impregnation was uniform and complete, dried as before, and calcined for five hours at 1300° F.

Inspection of this catalyst showed that it contained 20.1 per cent chromia, 8.0 per cent beryllia, and 71.9 per cent alumina.

Conversion and operating data for the dehydrogenation of butane and a butane-butene feed, utilizing this catalyst, are found in Tables I and II, respectively.

EXAMPLE V

A coprecipitated alumina-beryllia base catalyst impregnated with chromic acid while the base was in a wet gel form was prepared as follows:

A quantity of coprecipitated base containing 6 per cent beryllia and 94 per cent alumina was prepared by the method presented in Example IV. The washed coprecipitate (base) was mixed with a calculated amount of a concentrated chromic-acid solution (the amount sufficient to give a finished catalyst containing 15 per cent chromia). The slurry which was formed upon the addition of the chromic acid was dried in an oven for 24 hours to expel chemically uncombined water. The dried material was broken into 4 to 8 mesh granules and calcined for five hours at 1300° F.

Inspection of this catalyst showed that it contained 15 per cent chromia, 5 per cent beryllia and 80 per cent alumina.

Conversion and operating data for the dehydrogenation of butane and a butane-butene feed, utilizing this catalyst, are found in Tables I and II, respectively.

Table I, which follows, is a summary of operating data on butane dehydrogenation utilizing catalysts of Examples I, II, III, IV and V:

1600° F. for four hours prior to passing the feed through the catalyst. (This is an accelerated life test for the catalyst that has been found to be equivalent to normal deactivation of commercial dehydrogenation catalysts over about a six to nine-month period of normal operation in a butadiene plant.)

In one application of the catalysts of this invention, namely their use in a two-stage adiabatic process for the catalytic dehydrogenation of n-butane to butadiene, important catalyst properties are: relative dehydrogenation activity and selectivity of the dehydrogenation reactions; ratio of carbon deposit to dehydrogenation activity; the probable useful life of the catalyst as indicated by activity decline on heat treatment; and butene production from n-butane feed since this value determines the composition of the recycle feed and thus is a major factor in determining production of dehydrogenated products.

Table II, which follows, is a summary of operating data obtained in the conversion of a 60 per cent n-butane–40 per cent n-butene feed utilizing the catalysts of Examples I, II, III, IV and V:

*Table II*
BUTANE-BUTENE CONVERSION DATA

| Catalyst of | Example I | | Example II | | Example III | | Example IV | | Example V | |
|---|---|---|---|---|---|---|---|---|---|---|
| Hrs. of Heat Treatment at 1,600° F | 0 | 4 | 0 | 4 | 0 | 4 | 0 | 4 | 0 | 4 |
| Feed: | | | | | | | | | | |
| n-Butane (percent) | 60 | 60 | 60 | 60 | 60 | 60 | 60 | 60 | 60 | 60 |
| n-Butene (percent) | 40 | 40 | 40 | 40 | 40 | 40 | 40 | 40 | 40 | 40 |
| Space Rate (Liq. V./Cat. V./Hr.) | 2.3 | 2.3 | 2.3 | 2.3 | 2.3 | 2.3 | 2.3 | 2.3 | 2.3 | 2.3 |
| Av. Cat. Temp. (° F.) | 1,100 | 1,100 | 1,100 | 1,100 | 1,100 | 1,100 | 1,100 | 1,100 | 1,100 | 1,100 |
| Pressure (in. of Hg abs.) | 5 | 5 | 5 | 5 | 5 | 5 | 5 | 5 | 5 | 5 |
| Time on stream (min.) | 15 | 15 | 15 | 15 | 15 | 15 | 15 | 15 | 15 | 15 |
| Product Analysis: | | | | | | | | | | |
| Carbon | 2.3 | 2.8 | 5.4 | 3.6 | 5.4 | 3.6 | 3.6 | 2.8 | 4.2 | 1.1 |
| Hydrogen | 1.9 | 1.5 | 2.5 | 3.1 | 2.9 | 3.0 | 3.1 | 2.2 | 1.4 | 1.5 |
| $C_3$ and $C_5$ | 3.6 | 3.9 | 5.2 | 5.3 | 5.4 | 7.8 | 6.2 | 5.2 | 7.6 | 2.3 |
| Butadiene | 16.9 | 15.4 | 11.2 | 14.7 | 13.1 | 12.7 | 17.2 | 13.7 | 10.4 | 12.0 |
| Butene | 32.9 | 24.3 | 33.7 | 31.1 | 36.6 | 33.0 | 35.1 | 29.7 | 32.0 | 40.4 |
| Butane | 42.4 | 52.1 | 42.0 | 42.2 | 36.6 | 39.9 | 34.8 | 46.4 | 44.4 | 42.7 |
| Total Conversion* (Wt. percent) | 43 | 32.2 | 42.6 | 44.8 | 50.5 | 47.5 | 55.6 | 37.8 | 39.7 | 34.7 |
| Ratio of Total Conversion to Carbon | 19 | 11 | 8 | 12 | 9 | 13 | 15 | 14 | 9 | 32 |

*See Table I—Note.

This table, as did Table I, shows the superiority of catalysts of this invention (Examples IV and V) over other catalysts presented in the table.

As in Table I, inspection of the activity test results demonstrate the improved features of the catalysts of this invention (Examples IV and V) over catalysts not containing beryllia (Examples I and II) and the catalyst beryllia added by impregnation. These improvements are higher overall dehydrogenation activity and improved dehydrogenation selectivity, particularly after heat treatment for four hours at 1600° F., which is evidence of greatly improved catalyst life; and lower relative coke

*Table I*
BUTANE CONVERSION DATA

| Catalyst of | Example I | | Example II | | Example III | | Example IV | | Example V | |
|---|---|---|---|---|---|---|---|---|---|---|
| Hrs. of heat treatment at 1,600° F | 0 | 4 | 0 | 4 | 0 | 4 | 0 | 4 | 0 | 4 |
| Feed, n-butane (percent) | 100 | 100 | 100 | 100 | 100 | 100 | 100 | 100 | 100 | 100 |
| Space Rate (Liq. V./Cat. V./Hr.) | 1.2 | 1.2 | 1.2 | 1.2 | 1.2 | 1.2 | 1.2 | 1.2 | 1.2 | 1.2 |
| Av. Cat. Temp. (° F.) | 1,100 | 1,100 | 1,100 | 1,100 | 1,100 | 1,100 | 1,100 | 1,100 | 1,100 | 1,100 |
| Pressure (in. of Hg abs.) | 5 | 5 | 5 | 5 | 5 | 5 | 5 | 5 | 5 | 5 |
| Time on stream (min.) | 15 | 15 | 15 | 15 | 15 | 15 | 15 | 15 | 15 | 15 |
| Product Analysis: | | | | | | | | | | |
| Carbon (Wt. percent) | 1.9 | 3.3 | 5.7 | 4.1 | 7.0 | 3.4 | 5.0 | 2.3 | 2.9 | 1.8 |
| Hydrogen (Wt. percent) | 3.2 | 2.7 | 4.2 | 4.4 | 4.4 | 3.3 | 4.4 | 3.7 | 4.0 | 3.2 |
| $C_3$ and $C_5$ (Wt. percent) | 5.6 | 6.3 | 8.3 | 7.5 | 9.0 | 7.4 | 7.8 | 8.4 | 7.8 | 4.4 |
| Butadiene (Wt. percent) | 13.8 | 9.9 | 9.9 | 10.7 | 10.8 | 12.2 | 13.4 | 14.7 | 15.8 | 11.7 |
| Butene (Wt. percent) | 30.4 | 15.1 | 29.7 | 25.4 | 30.5 | 29.2 | 30.7 | 28.6 | 50.3 | 48.5 |
| Butane (Wt. percent) | 45.1 | 62.7 | 42.2 | 47.9 | 38.3 | 44.5 | 38.7 | 42.3 | 19.2 | 30.4 |
| Total Conversion* (Wt. percent) | 79.4 | 59.5 | 85.9 | 78.8 | 92.9 | 81.8 | 91.9 | 86.8 | 111.3 | 90.7 |
| Ratio of Total Conversion to Carbon | 42 | 18 | 15 | 19 | 13 | 24 | 18 | 38 | 38 | 50 |

*Note.—Total conversion is equal to: Butane conversion+butene conversion wherein butane conversion is butane in feed—butane in product; and butene conversion is butene in feed+butane conversion—butene in product.

From the foregoing Table I it is apparent that the total conversion is higher when beryllia is a component of the catalyst. Likewise, it is apparent that catalysts of this invention, as exemplified by Examples IV and V, have as high or higher initial catalytic activity than the impregnated type of catalyst as illustrated by Example III. Furthermore, the catalysts of this invention have a higher sustained catalytic conversion rate than any of the catalysts of Examples I, II, or III as shown in the column of the table wherein the catalyst had a heat treatment at (carbon) production. This latter property is particularly important in processes where coke-burning capacity is a limiting feature or in adiabatic processes where catalytic reactors must be operated at conditions giving essentially zero net heat, that is, an endothermic heat of reaction equal to the exothermic heat of regeneration.

The thermal-stability and catalytic-activity properties of a catalyst are used in ascertaining the relative catalytic (conversion) life of the catalyst. This latter property may be determined by one of two methods. The catalytic life of catalysts having a relatively short conversion life may be determined by using the catalyst in a pilot test under actual operating conditions. This test is not practical in determining the catalytic life of catalysts suspected of having a long catalytic life because of the time involved. In order to overcome this difficulty, an accelerated life test is often made. This test is made by first measuring the catalytic activity of the catalyst under normal operating conditions for a specified time, then subjecting the catalyst to a temperature above normal conversion temperatures for a definite time, and then again measuring the activity of the catalyst under normal operating conditions. Accelerated life tests of this type, although they do not give an accurate measure of the catalyst's useful life in commercial service, do provide a relatively simple and reliable means for comparing relative life of various catalysts.

Catalysts that have a long catalytic life and a high catalytic activity are especially desirable. Both of these properties are very important but one without the other does not give a particularly desirable catalyst.

The appended graph shows results obtained with a series of heat treatments at 1600° F. for times from 0 to 12 hours on the catalysts of Examples I, II, III, IV, and V.

Referring to the appended graph, curves 1, 2, 3, 4, and 5 represent results obtained from catalysts of Examples I, II, III, IV, and V, respectively, after being subject to the heat treatment described above. These results were obtained under conditions similar to those given in Table I. The feed was 100 per cent butane. The "Total conversion (weight percent)" on the graph is butane conversion+butene conversion wherein butane conversion is butane in feed less butane in product; and butene conversion is butene in feed+butane conversion less butene in product. From this graph it can be seen that curves 4 and 5 exhibit a higher sustained conversion of a 100 per cent butane feed than do curves 1, 2, or 3. It can be concluded from the curves of the appended graph that catalysts of this invention give higher sustained conversion activity than do known catalysts of similar composition.

X-ray diffraction analyses were made on samples of catalysts from Examples II, III, and IV in order to determine if there were structural differences in these catalysts which may account for the large differences in catalytic activity and thermal stability. Table III, which follows, lists some of the major lines observed on fresh and severely heat-treated catalysts of examples II, III, and IV, In this table "d" values are interplanar distances measured in Angstrom units and "I" values are intensities of lines in arbitrary units from 0, barely visible, to 10, very strong.

invention, and all such changes as are included within the scope of the claims are embraced thereby.

We claim:
1. A process for dehydrogenating hydrocarbons which comprises contacting a feed comprising hydrocarbons having 2 to 8 carbon atoms per molecule at a temperature of about 700° to about 1250° F. with a catalyst comprising below about 77% of an oxide material of the group consisting of alumina and a mixture of alumina and silica, above about 8% beryllia and about 15 to about 20% of an oxide of a metal selected from the sixth group of the periodic table coprecipitated from an aqueous solution thereof.

2. The process for dehydrogenating hydrocarbons which comprises contacting a feed consisting essentially of hydrocarbons having 2 to 8 carbon atoms per molecule at a temperature of from about 700° F. to about 1250° F. with a catalyst consisting essentially of below about 77% of an alumina-containing material of the group consisting of alumina and a mixture of alumina and silica, together with above about 8% beryllia, and supported thereon, from about 15 to about 20% of an oxide of a metal selected from the left-hand column of group VI of the periodic table, said catalyst having been prepared by coprecipitating from an aqueous solution said alumina-containing material and said beryllia in the form of the corresponding hydroxides, converting said hydroxides to the corresponding oxides, impregnating said oxides with an aqueous solution of a compound of a metal selected from the left-hand column of group VI of the periodic table, and thereafter converting said group VI metal compound to its corresponding oxide.

3. The process of claim 2 wherein the group VI metal oxide is chromium oxide.

4. The process of claim 2 wherein the group VI metal oxide is molybdenum oxide.

5. The process for dehydrogenating hydrocarbons which comprises contacting a feed consisting essentially of hydrocarbons having 2 to 8 carbon atoms per molecule at a temperature of from about 700° F. to about 1250° F. with a catalyst consisting essentially of below about 77% of an alumina-containing material of the group consisting of alumina and a mixture of alumina and silica, together with above about 8% beryllia, and supported thereon, from about 15 to about 20% of an oxide of a metal selected from the left-hand column of group VI of the periodic table, said catalyst having been prepared by coprecipitating from an aqueous solution said alumina-containing material and said beryllia in the form of the corresponding hydroxides, impregnating the coprecipitate with an aqueous solution of a compound of a metal selected from the left-hand column of group VI of

*Table III*
X-RAY DIFFRACTION

| Example II—Catalyst | | | | Example III—Catalyst | | | | Example IV—Catalyst | | | |
|---|---|---|---|---|---|---|---|---|---|---|---|
| Fresh | | Heat Treatment, 24 Hrs. at 1,600° F. | | Fresh | | Heat Treatment, 24 Hrs. at 1,600° F. | | Fresh | | Heat Treatment, 24 Hrs. at 1,600° F. | |
| d | I | d | I | d | I | d | I | d | I | d | I |
| 3.61 | 0 | | | 3.51 | 1 | 3.53 | 0 | 3.53 | 1 | 3.48 | 1 |
| | | 3.39 | 1 | | | 3.16 | 1 | | | 3.18 | 1 |
| 2.69 | 0 | 2.63 | 0 | 2.60 | 2 | | | 2.59 | 2 | 2.52 | 0 |
| | | 2.37 | 0 | 2.13 | 0 | 2.245 | 1 | 2.15 | 0 | | |
| 1.99 | | 2.05 | 2 | 1.95 | 0 | 2.07 | 1 | 2.01 | 0 | 2.06 | 3 |
| 1.385 | 5 | 1.37 | 6 | 1.382 | 3 | 1.382 | 3 | | | 1.400 | 2 |
| | | | | | | | | | | 1.368 | 3 |
| 1.27 | 1 | 1.23 | 0 | 1.28 | 0 | | | | | 1.138 | 0 |

From the above table, it can be seen that the coprecipitation addition of beryllia to the catalyst of Example IV resulted in a different crystalline structure from that of the precipitated alumina plus chromia of Example II or the catalyst of Example III where beryllia was added by impregnation.

Identification of this new structure of Example IV could not be made from published diffraction patterns, but the differences were quite evident from the presence of new lines, absence of other lines and in some cases shifting of diffraction lines.

While various specific embodiments of the invention have been illustrated and described, many modifications and adaptions may be made without departing from this the periodic table, and thereafter converting all of the elements of the impregnated coprecipitate to the corresponding oxides.

6. The process of claim 5 wherein the group VI metal oxide is chromium oxide.

7. The process of claim 5 wherein group VI metal oxide is molybdenum oxide.

References Cited in the file of this patent

UNITED STATES PATENTS

| 2,393,537 | Huffman | Jan. 22, 1946 |
| 2,411,829 | Huffman | Nov. 26, 1946 |
| 2,483,929 | Owen | Oct. 4, 1949 |
| 2,536,085 | Pitzer | Jan. 2, 1951 |